C. A. BLAIR.
ENVELOP SEALER.
APPLICATION FILED JULY 26, 1909.

1,092,471.

Patented Apr. 7, 1914.
7 SHEETS—SHEET 1.

Witnesses
Frank A. Fahle
Thomas W. McMeans

Inventor
Charles A. Blair,
By Bradford & Hood,
Attorneys.

C. A. BLAIR.
ENVELOP SEALER.
APPLICATION FILED JULY 26, 1909.

1,092,471.

Patented Apr. 7, 1914.
7 SHEETS—SHEET 2.

C. A. BLAIR.
ENVELOP SEALER.
APPLICATION FILED JULY 26, 1909.

1,092,471.

Patented Apr. 7, 1914.

Witnesses
Frank A. Fahle
Thomas W. McMeans

Inventor
Charles A. Blair,
By Bradford & Hood,
Attorneys

C. A. BLAIR.
ENVELOP SEALER.
APPLICATION FILED JULY 26, 1909.

1,092,471.

Patented Apr. 7, 1914.

Witnesses
Frank A. Fahle
Thomas W. McMeans

Inventor
Charles A. Blair,
By Bradford & Hood,
Attorneys.

C. A. BLAIR.
ENVELOP SEALER.
APPLICATION FILED JULY 26, 1909.

1,092,471.

Patented Apr. 7, 1914.
7 SHEETS—SHEET 5.

Witnesses
Frank A. Fahle
Thomas W. McMeans

Inventor
Charles A. Blair,
By Bradford & Hood,
Attorneys.

C. A. BLAIR.
ENVELOP SEALER.
APPLICATION FILED JULY 26, 1909.

1,092,471.

Patented Apr. 7, 1914.
7 SHEETS—SHEET 6.

Witnesses
Frank A. Fahle
Thomas W. McMeans

Inventor
Charles A. Blair
By Bradford & Hood,
Attorneys.

C. A. BLAIR.
ENVELOP SEALER.
APPLICATION FILED JULY 26, 1909.

1,092,471.

Patented Apr. 7, 1914.

Witnesses
Frank O. Fable
Thomas W. McMeans

Inventor
Charles A. Blair
By Bradford & Hood,
Attorneys.

UNITED STATES PATENT OFFICE.

CHARLES A. BLAIR, OF INDIANAPOLIS, INDIANA.

ENVELOP-SEALER.

1,092,471.  Specification of Letters Patent.  Patented Apr. 7, 1914.

Application filed July 26, 1909. Serial No. 509,551.

*To all whom it may concern:*

Be it known that I, CHARLES A. BLAIR, a citizen of the United States, residing at Indianapolis, in the county of Marion and State of Indiana, have invented certain new and useful Improvements in Envelop-Sealers, of which the following is a specification.

In establishments which conduct a heavy correspondence the labor of sealing envelops is not only tedious and expensive, but involves some inaccuracy inseparable from hand as distinguished from mechanical operations.

The object of my present invention is to provide a machine or apparatus by means of which all envelops passing through it shall be certainly and effectually sealed, rapidly and certainly.

A machine or apparatus embodying my said invention will first be fully described, and the novel features thereof then pointed out in the claims.

Referring to the accompanying drawings, which are made a part hereof, and on which similar reference characters indicate similar parts.

By the use of this machine I am able to seal quantities of envelops rapidly and certainly.

After the machine is arranged ready for use, with a quantity of envelops to be sealed placed therein, all the operations necessary to the sealing and delivering of the envelops from the machine are performed, successively and automatically, by merely turning the crank with which the machine is provided.

Having thus stated in a general way what my machine accomplishes, I will now proceed to describe the construction in detail.

Figures 1, 2:
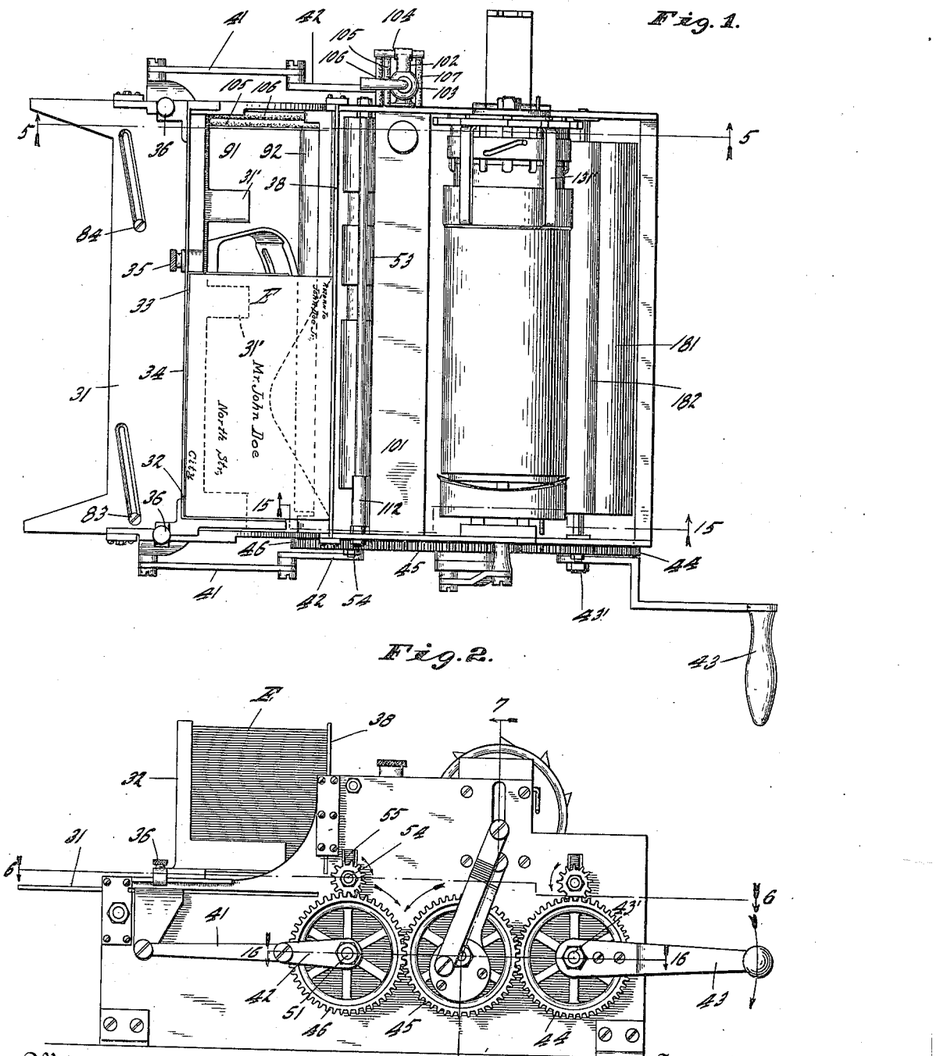
Figure 1 is a top or plan view of such a machine, as it appears when in condition for operation.
Fig. 2 an elevation of one end thereof.
Figure 11:
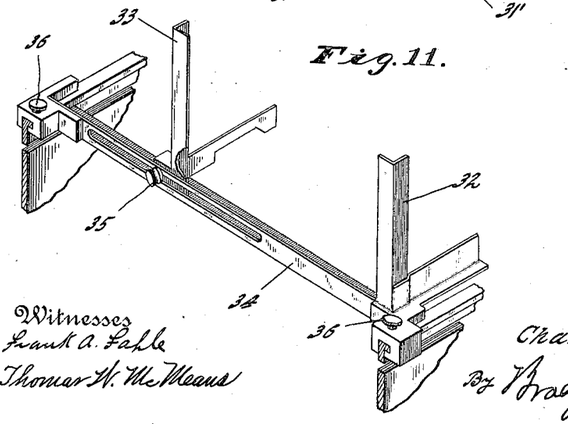
Fig. 11 a perspective view illustrating the envelop-retaining posts and the parts immediately adjacent thereto, showing how the machine can be adjusted to operate upon envelops of different sizes.

The envelops (as E, see Fig. 2) to be sealed are first placed upon a reciprocating bed 31, between suitable stationary upright guides 32 and 33, the latter of which is adjustably mounted on bar 34 in order to enable the operator to adjust the space to the size of the envelops which are to be sealed— the adjustment being effected, in the construction shown (see especially Fig. 11) by means of the clamping screw 35 passing through a slot in bar 34 and engaging with a suitable part at the lower end of post 33. The bar 34, and the posts carried thereby, are capable of adjustment on the frame of the machine as a whole, as is also best shown in Fig. 11, the portions at end of bar 34 having suitable L-shaped grooves which pass over similarly shaped rails on the frame of the machine, to which they may be clamped at any desired point by means of clamping screws 36. The envelops are placed with the flaps beneath and to the front, as indicated by dotted lines in Fig. 1. The reciprocating bed 31 is actuated by a pitman 41 from cranks 42 on the shaft 51 of one of the rollers, the primary driver being a hand crank 43, placed, for convenience, on another of the roller shafts 43' of the machine, and the several shafts 51, 43' and 122' being connected together by a train of gears 44, 45 and 46, as best shown in Fig. 2.

Figures 5, 6:
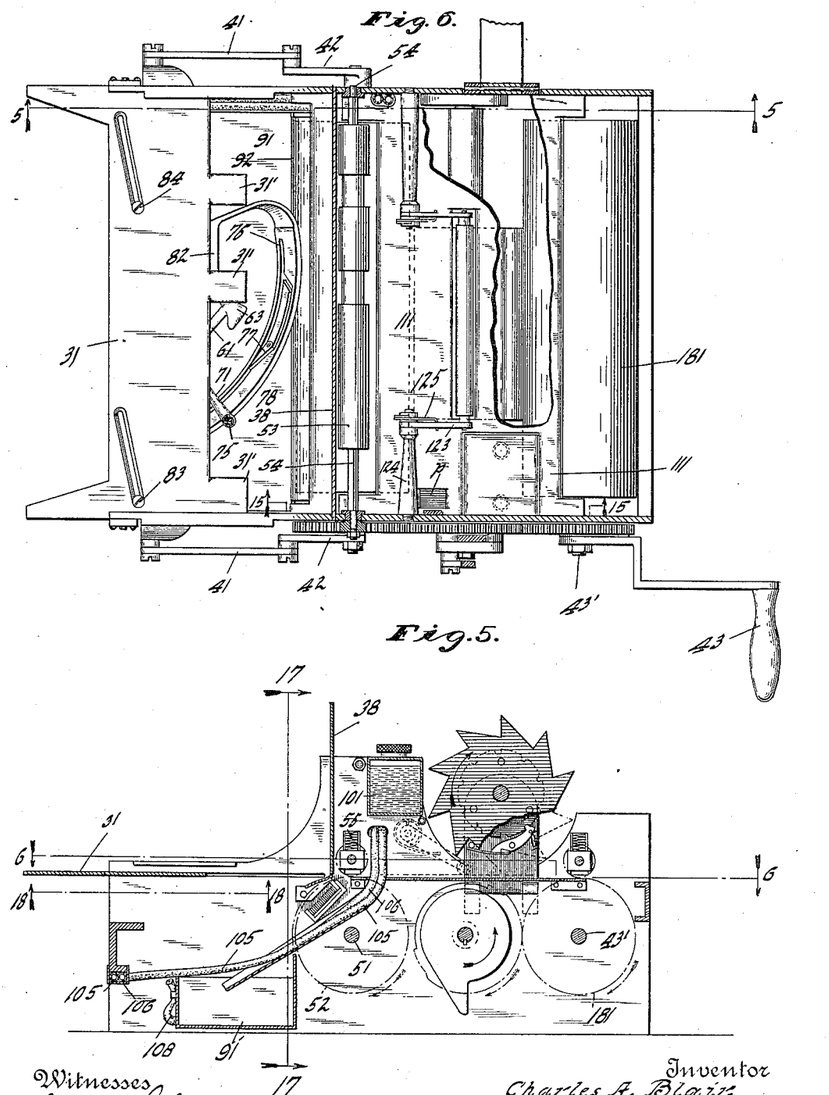
Fig. 5 a transverse vertical sectional view as seen when looking in the direction indicated by the arrows from the broken lines 5 5 in Figs. 1, 4 and 6.
Fig. 6 a horizontal sectional view as seen when looking downwardly from the broken line 6 6 in Figs. 2 and 5.
Figure 10:
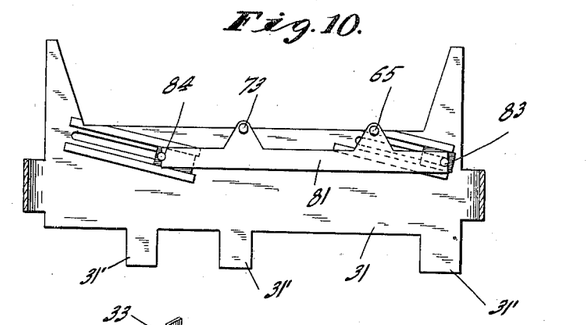
Fig. 10 a detail underside plan view, as seen when looking upwardly toward the underside of the envelop carriage from the position indicated by the broken line 18 18 in Fig. 5.

Returning now to the envelops, the first operation is that the bed 31 will advance, and the tongues 31' thereon (see Figs. 6 and 10, and dotted lines in Fig. 1) will pass under the flap of the lowermost envelop and drive the same forward, all the other envelops of the pile being held to position by means of the wall or plate 38 on the opposite side of the pile from the guide arms 32 and 33—the arrangement being such that just one envelop at a time may pass below the lower edge of the said wall or plate. The envelop is carried forward by the reciprocating bed 31 until it is engaged between the rollers 52 on shaft 51, and 53 on shaft 54 (see Fig. 7)—the latter being held downwardly and yieldingly against the former by means of springs 55.

Figure 16:
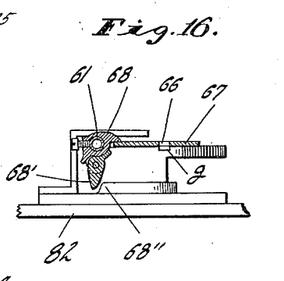
Fig. 16 a detail sectional view as seen when looking in the direction indicated by the arrows from the broken line 24 24 in Figs. 12 and 15.

In the meantime (see Figs. 6 and 12 to 16 inclusive) just at the time the bed begins to move, and just before the envelop is given this initial movement, the moistening preparatory to sealing takes place. As the bed 31 starts forward, the hollow swinging arm 61, pivoted at 62, and bearing the flap-opening blade 63, is started forward, and said blade passes between the flap and body of the envelop, opening said flap, and enabling the sealing surface to be moistened. Said hollow arm also has at the same end which carries blade 63 a moistening pad 64 (formed of sponge or similar absorbent material), which is kept moistened by the flow of fluid through the hollow arm 61, as will be presently more fully described. This moistening pad distributes the moisture over the surface of that portion of the envelop opposite one side of the center of the flap preparatory to the sealing operation, but does not come in contact with the gummed surface of the flap itself, thus avoiding getting any of the gum onto the moistening pad. The swinging reciprocatory movement of arm 61 is given to it by means of the engagement of a pin 65 which extends down from the reciprocating bed plate 31 and engages with a cam slot 66 in the carrier 67 in which said arm 61 is mounted. The normal travel of the parts just described is indicated by the dotted and full lines respectively in Fig. 12—the extreme position at one end of the path of travel being shown by the full lines, and that at the other end of the path of travel by dotted lines. The tubular arm 61 is so mounted in its carrier 67 as to permit of a limited rocking or rotary movement. The object of this is to cause the flap-opening blade to be presented upwardly where it will certainly engage with the flap at the beginning of the movement of the arm, while said arm is also capable of revolving somewhat and thus bringing the moistening pad 64 into more effective position for operation after the flap has been opened, and, at the same time, by the shifting of the position of the flap-opening blade, to more widely open the flap for the admission of the other moistening pad. The arm rocks back on its return movement and a second and unnecessary application of moisture from the pad to the surface of the envelop is thus avoided. This movement is effected, and the stated results secured, by the following instrumentalities: A block 68 is secured to tubular arm 61, and a coiled spring 69 is secured at one end to said block and at the other end to said carrier. The tendency of said spring is to hold the arm in position to keep the flap-opening blade with its edge somewhat inclined upwardly to facilitate the initial passing below the flap of the envelop as already described. Secured to the underside of the block 68 (see especially Fig. 16) is a pivoted pawl 68'; and this, as the arm advances, comes in contact with a cam projection 68'' on the adjacent portion of the framework, thus causing the arm 61 to rock sufficiently to bring the moistening pad to its uppermost position, and retains it there until the arm has passed over said cam-like projection, when it will be returned by the force of spring 69 to its former position. The pawl 68' (being pivoted) will not affect the position of arm 61 during its return movement, as will be readily understood.

Figure 12:
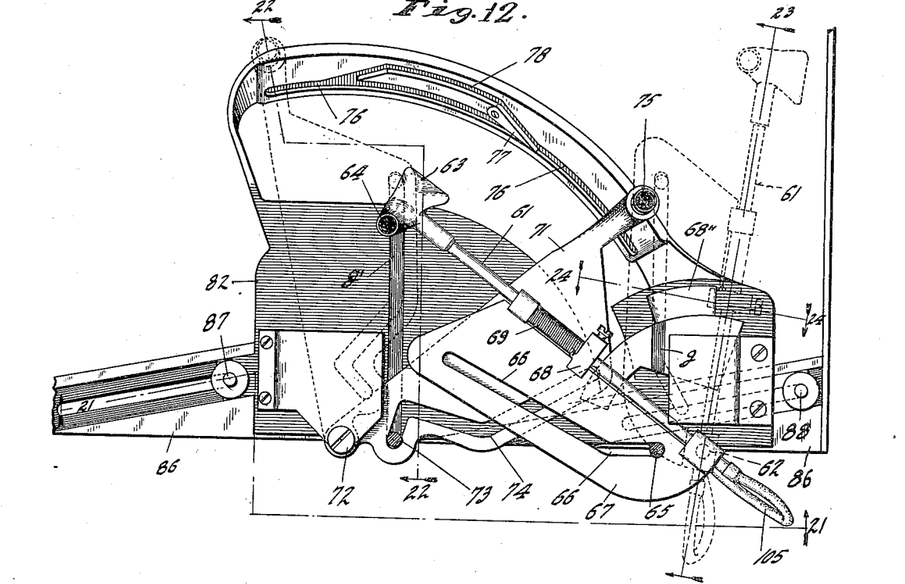
Fig. 12 a detail plan view of the envelop-moistening devices and immediately adjacent parts as seen when looking downwardly from the broken line 20 20 in Fig. 13.
Figure 13:
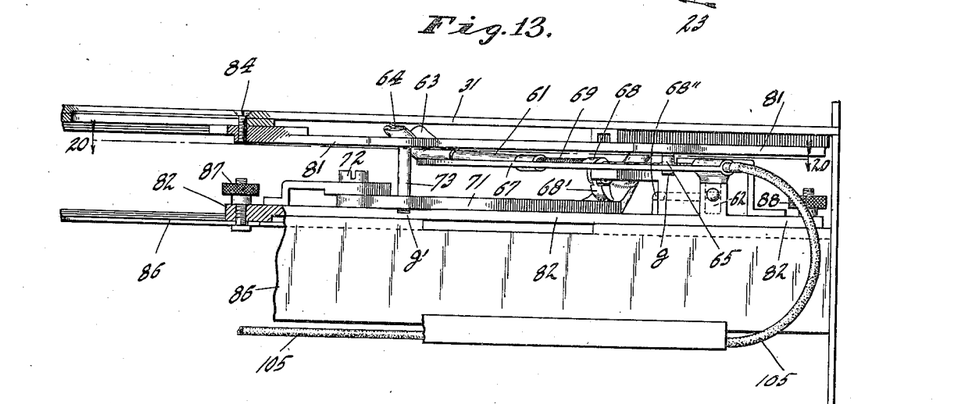
Fig. 13 a view partially in section and partially in elevation as seen when looking in the direction indicated by the arrows from the broken line 21 21 in Fig. 12.
Figure 14:
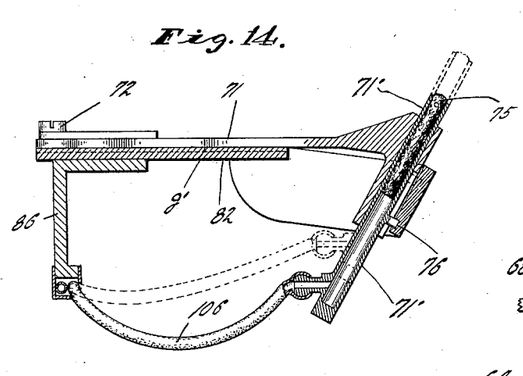
Fig. 14 a detail sectional view as seen when looking in the direction indicated by the arrows from the broken line 22 22 in Fig. 12.
Figure 15:
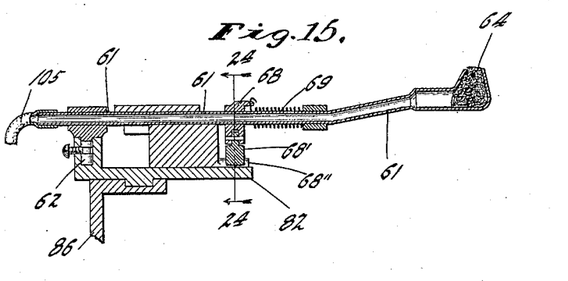
Fig. 15 a detail sectional view as seen when looking in the direction indicated by the arrows from the broken line 23 23 in Fig. 12, when the parts are in the position indicated by the dotted lines therein.

That portion of the surface of the envelop on the other side of the center is moistened by means of a second swinging arm 71 secured to the frame of the machine by pivot 72 and operated by a pin 73 extending down from the reciprocating bed plate 31 into a slot 74 in the plate-like portion of said arm 71. Arm 71 (like arm 61) carries a moistening pad 75. It is necessary to the performance of this work that the paths of travel of the moistening pads should cross. It is also of course necessary that when one moistening pad is in such position that the arms carrying the two moistening pads cross each other, the one should be in a lower plane than the other, while it is also necessary that both moistening pads should operate in substantially the same plane. I have therefore provided a curved guiding path arranged concentrically with the pivotal axis of arm 71, and arranged that said guiding path should raise and lower the moistening pad 75 at appropriate points to effect this result. In Fig. 12 this is illustrated somewhat in perspective, and the movement is indicated by the dotted lines in Fig. 14. The main guiding path or groove 76 is in such a plane as to carry pad-holder 71' on arm 71 below arm 61. Said pad-holder travels in its lower plane the whole distance of its movement in traveling from left to right. On its forward movement, or its movement from right to left, however, at the point when arms 61 and 71 have just passed each other so as to be free from each other, the engaging point 76 on pad-holder 71' comes in contact with pivoted tongue 77, and travels up the same, into the groove or path 78; and thereafter, until it reaches nearly the end of its movement, it travels in the higher plane, so that the moistening pad comes in contact with the surface to be moistened. As it approaches the end of its movement it descends to the lower plane, and the movement is repeated, as will be readily understood upon an inspection of said Fig. 12 of the drawing. The construction and arrangement of the pad-holder 71' is best shown in Fig. 14. It is a tubular member mounted in a suitable way in the end of arm 71 in which it moves up and down (preferably on an incline, as shown) and is connected with moisture-supply tube 106 at one end, and carries moistening pad 75 at the other.

The pins 65 and 73, which are the immediately operating devices for effecting the movement of arms 61 and 71, engage at their lower ends with guiding and supporting grooves $g$ $g'$ in the part below (see Fig. 12), and are thus enabled to perform the work with greater certainty. Said pins are immediately carried by a separate base plate 81, which is adjustable on the reciprocating bed plate 31. This part 81 may be so shifted as to accommodate the machine to envelops of various sizes. The frame part 82, containing the grooves $g$ and $g'$ with which the points of pins 65 and 73 engage, is also correspondingly adjustable. This will be best understood by reference to Figs. 1 and 12. The base plate 81 is secured to reciprocating bed plate 31 by means of screws 83 and 84 which pass through diagonal slots in said bed plate 31. The frame member 82 is secured to the adjacent portion of main frame 86 by means of clamping screws 87 and 88 which pass through diagonal slots in said main frame portion, corresponding in direction of inclination to the slots previously spoken of in reciprocating bed plate 31. The movement thus provided for maintains the proper relation of the flap-opening and moistening parts to the envelops being operated upon, whatever their size. The desirability of inclination of the slots described will be better understood when it is remembered that the angles of envelop flaps differ in different sized envelops.

Figure 7:
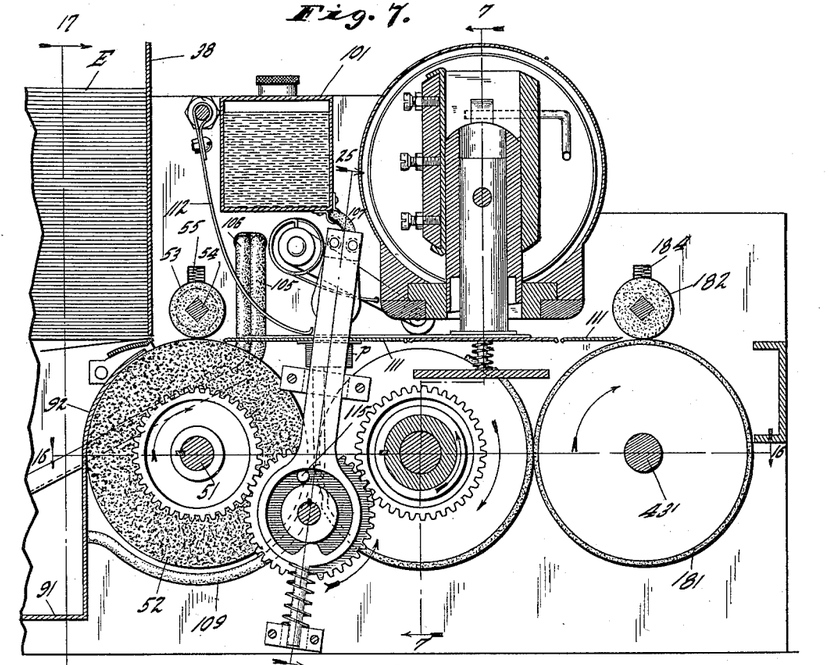
Fig. 7 a detail sectional view, also on an enlarged scale, as seen when looking in the direction indicated by the arrows from the broken lines 15 15 in Figs. 1, 6 and 18.
Figure 8:
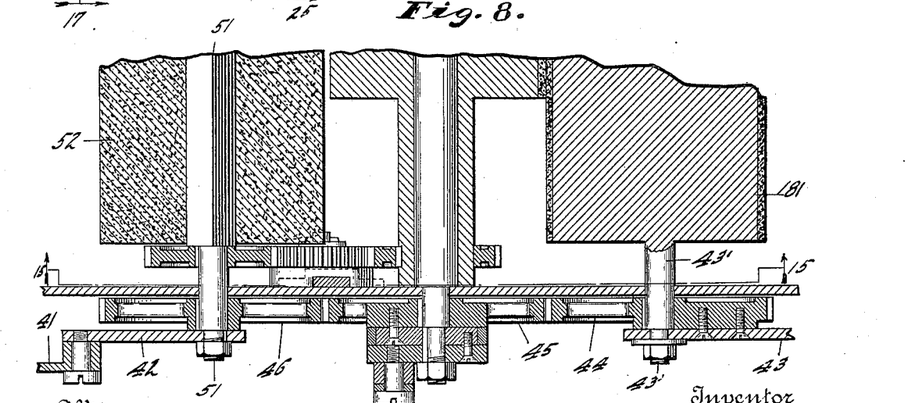
Fig. 8 a detail horizontal sectional view as seen when looking downwardly from the broken line 16 16 in Figs. 2 and 7.
Figure 9:
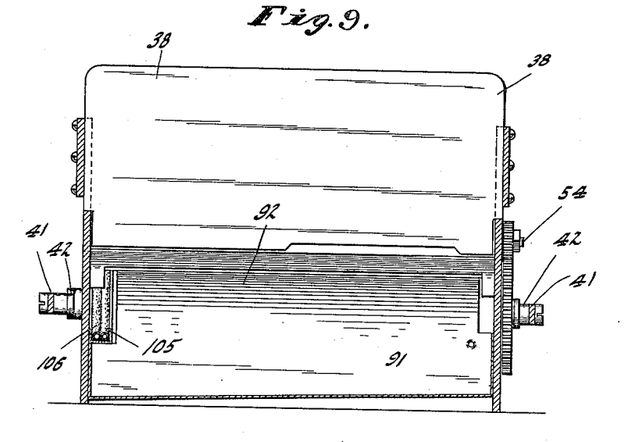
Fig. 9 a longitudinal vertical sectional view as seen when looking in the direction indicated by the arrows from the broken line 17 17 in Fig. 5.

As is obvious, there is more or less drip from the moistening pads, which (as will be presently more fully explained are constantly supplied through hose from a tank); and, therefore, I provide below these parts a drip pan 91, one side 92 of which extends up over the roller 52 to near the point where the envelop comes in contact therewith, as best shown in Fig. 7, to protect said roller from the moisture, while the bottom extends back to below the mechanism which has just been described. Said pan is of course provided with side and end walls, giving it sufficient capacity for the purpose.

Figure 3:
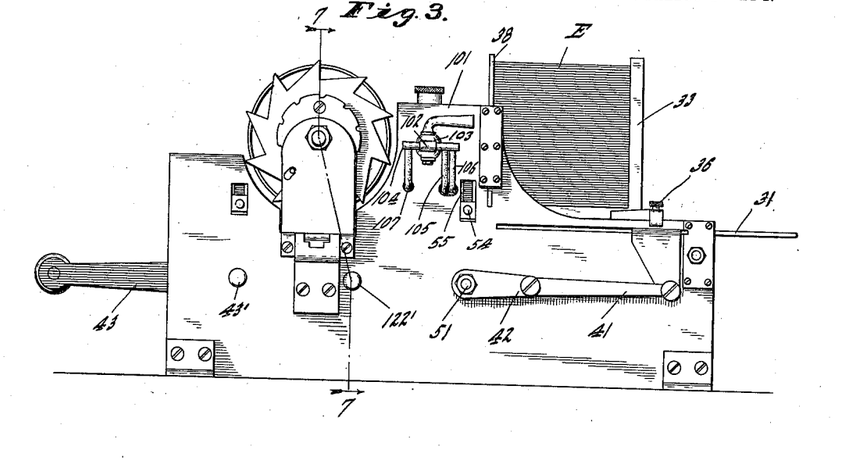
Fig. 3 an elevation of the other end.
Figure 4:
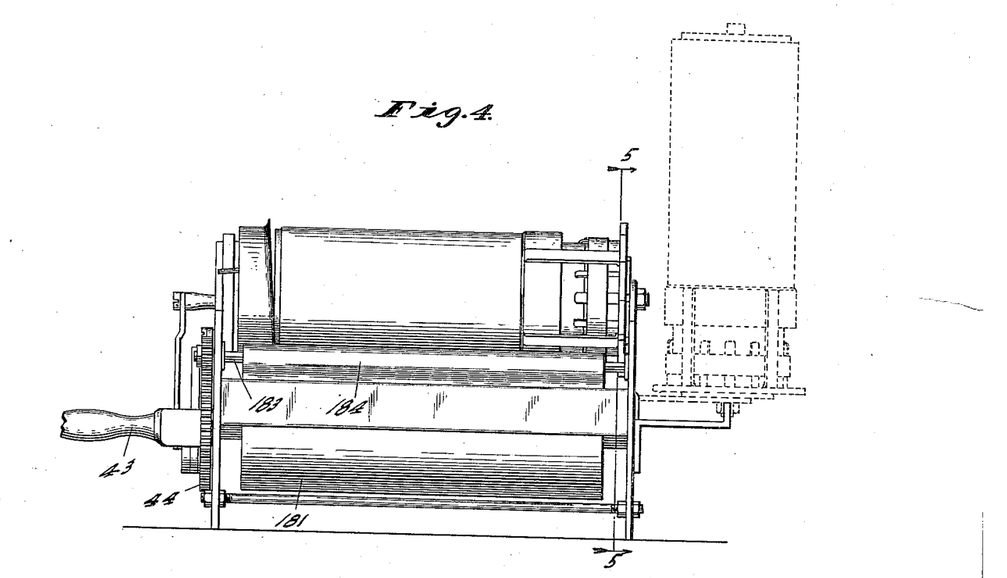
Fig. 4 a rear side elevation.

The moisture is supplied from a tank 101. This tank (see especially Figs. 1 and 3) has a discharge pipe 102 leading out from one end, and said pipe is provided with a valve 103. Beyond the valve is a cross pipe 104, and from this cross pipe the various lines of hose 105, 106 and 107 lead to the various moistening pads—hose 105 leading to moistening pad 64, hose 106 leading to moistening pad 75, and hose 107 leading to the moistening pad for supplying moisture for the purpose of affixing the postage stamps. The drip pan 91 is provided with a discharge outlet to which is connected a hose 108, for the purpose of leading away the waste water.

After the appropriate portion of the surface of an envelop has been moistened for sealing, it passes on between rollers 52 and 53, by which the sealing operation is substantially completed, and thence onto bed plate 111 (see Fig. 7) against which it is held by a suitable spring 112. When the envelop reaches this point, it is moistened at the place where a stamp is to be affixed, and is then carried through the machine and discharged from between the rollers 181 and 182, a stamp being affixed to the moistened place by suitable apparatus, not claimed herein, as the envelop passes from between the rollers 52 and 53 to between the rollers 181 and 182.

Having thus fully described my said invention, what I claim as new, and desire to secure by Letters Patent, is:

1. The combination, in a machine for preparing envelops for mailing, of an envelop holder, a pair of rolls to which each envelop is delivered for further manipulation, a reciprocating bed having fingers adapted to pass beneath the flap of the lowermost envelop and thus give it its initial movement, and means mounted on a substantially fixed support and operated by said reciprocating bed for applying moisture to the surface to be sealed.

2. The combination, in a machine for preparing envelops for mailing, of an envelop holder, a pair of rolls to which each envelop is delivered for further manipulation, a reciprocating bed having fingers adapted to pass beneath the flap of the lowermost envelop and thus give it its initial movement, means mounted on a substantially fixed support and operated by said reciprocating bed for applying moisture to the surface to be sealed, and mechanical connections whereby the reciprocating bed and the moisture-applying devices are operated synchronously.

3. The combination, in a machine for preparing envelops for mailing, of means for moving the envelops one by one from the bottom of a pile, tubular arms swinging about an axis transverse to the envelop and carrying moistening pads adapted to pass beneath the flap of each envelop as it is taken from the pile and moisten the surface to be sealed, a tank, and flexible pipes leading from said tank to said tubular arms.

4. The combination, in a machine for preparing envelops for mailing, of an envelop container wherein a plurality of envelops are placed with the flaps downward, means for delivering the envelops one by one from the bottom of the pile, a pair of swinging arms carrying moistening pads adapted to pass beneath the flap of the envelop and thus moisten the sealing surface, and means whereby one of said pads is caused to pass below the other on its return movement thereby permitting said arms when in retracted position to cross each other.

5. The combination in a machine for preparing envelops for mailing, of an envelop support, a reciprocating bed for giving the envelops their initial movement, a pair of arms carrying moistening pads arranged below said bed and provided with cam slots and pins extending downwardly from said bed into said cam slots whereby said arms are caused to swing on their pivots as the bed reciprocates.

6. The combination, in a machine for preparing envelops for mailing, of an adjustable envelop container, a reciprocating bed extending below said container, a pair of swinging arms carrying moistening pads secured below said container, and means whereby said arms may be adjusted to be used with various sized envelops corresponding with the adjustment of the envelop container itself, and means for reciprocating said bed and swinging said arms.

7. The combination, in a machine for preparing envelops for mailing, of an adjustable envelop container, a reciprocating bed extending below said container, a pair of swinging arms carrying moistening pads secured below said container, and means whereby said arms may be adjusted to be used with various sized envelops corresponding with the adjustment of the envelop container itself, said adjusting means being arranged diagonally to the line of movement whereby the proper relation of the parts is maintained, and means for reciprocating said bed and swinging said arms.

8. The combination, in a machine for preparing envelops for mailing, of an envelop container, a reciprocating bed for giving the envelop its initial movement, a reciprocating moistening device mounted on a substantially fixed support and operated by said bed, and a pair of rolls to which the envelop is delivered by said bed for giving the envelop its further movement, one of said rolls being yieldingly mounted.

9. The combination, in a machine for preparing envelops for mailing, of an envelop holder, a reciprocating bed adapted to pass between the flap and body of the lowermost envelop in said holder and thus give such envelop its initial movement, means separate from said bed for passing between the flap and body of such lowermost envelop and applying moisture to the surface to be sealed before the reciprocation of said bed has moved the envelop, and a pair of rolls to which such envelop is delivered, for further manipulation, by the reciprocation of said bed.

10. The combination, in a machine for preparing envelops for mailing, of an envelop holder, a reciprocating bed adapted to pass between the flap and body of the lowermost envelop in said holder and thus give such envelop its initial movement, means for passing between the flap and body of said envelop and applying moisture to the body of such envelop opposite the gummed surface of the flap thereof before the reciprocation of said bed has moved the envelop, and a pair of rolls to which such envelop is delivered, for further manipulation, by the reciprocation of said bed.

11. The combination, in a machine for preparing envelops for mailing, of an envelop holder, a pair of rolls to which each envelop is delivered for further manipulation, a reciprocating bed adapted to pass between the flap and body of the lowermost envelop and thus give it its initial movement, and an arm which swings around an axis at right angles to the envelop-supporting surface of the bed and applies moisture to the surface to be seated.

12. The combination, in a machine for preparing envelops for mailing, of an envelop holder, a pair of rolls to which each envelop is delivered for further manipulation, a reciprocating bed adapted to pass between the flap and body of the lowermost envelop and thus give it its initial movement, and an arm which swings around an axis at right angles to the envelop-supporting surface of the bed and applies moisture to the surface of the body of the envelop opposite the gummed surface of the flap thereof.

13. The combination, in a machine for preparing envelops for mailing, of an envelop holder, a pair of rolls to which each envelop is delivered for further manipulation, a reciprocating bed adapted to pass between the flap and body of the lowermost envelop and thus give it its initial movement, and an arm which swings around an axis at an angle to the envelop supporting surface of the bed and applies moisture to the surface to be sealed.

14. The combination, in a machine for preparing envelops for mailing, of an envelop holder, a pair of rolls to which each envelop is delivered for further manipulation, a reciprocating bed adapted to pass between the flap and body of the lowermost envelop and thus give it its initial movement, and an arm which swings around an axis at an angle to the envelop-supporting surface of the bed and applies moisture to the surface of the body of the envelop opposite the gummed surface of the flap thereof.

15. The combination, in a machine for preparing envelops for mailing, of an envelop support, a reciprocating bed for giving the envelops their initial movement, a pair of arms carrying moistening pads and swinging below said bed on different axes at right angles to the envelop-supporting surface of said bed, and operating connections between said bed and said arms.

16. The combination, in a machine for preparing envelops for mailing, of an envelop support, a reciprocating bed for giving the envelops their initial movement, a pair of arms carrying moistening pads and swinging below said bed different axes at an angle to the envelop-supporting surface of said bed, and operating connections between said bed and said arms.

17. The combination, in a machine for preparing envelops for mailing, of an envelop support, an arm carrying a moistening pad and a flap-opening blade, said arm being rotatable about one axis and tiltable about another, and means for operating said arm to cause the blade thereof to pass between the flap and body of an envelop in said support and then tilt to bring the moistening pad into engagement with the surface to be sealed.

18. The combination, in a machine for preparing envelops for mailing, of an envelop support, an arm carrying a moistening pad and a flap-opening blade, said arm being rotatable about one axis and tiltable about another, and means for operating said arm to cause the blade thereof to pass between the flap and body of an envelop in said support and then tilt to bring the moistening pad into engagement with the surface of the body of the envelop opposite the gummed surfaces of the flap thereof.

19. The combination, in a machine for preparing envelops for mailing, of an envelop support, a pair of arms carrying moistening pads and swingable about separate axes which are at an angle to the plane of an envelop in said support, the ends of said arms crossing in their movement, and means for lowering the end of one of such arms to allow such crossing, and for raising it to bring the moistening pad thereon into engagement with the surface to be sealed during a part of the movement when the arms are uncrossed.

20. The combination, in a machine for preparing envelops for mailing, of an envelop support, a pair of arms carrying moistening pads and swingable about separate axes which are at an angle to the plane of an envelop in said support, the ends of said arms crossing in their movement, and means for lowering the end of one of such arms to allow such crossing, and for raising it to bring the moistening pad thereon into engagement with the body of the envelop opposite the gummed surface of the flap thereof during a part of the movement when the arms are uncrossed.

In witness whereof, I have hereunto set my hand and seal at Indianapolis, Indiana, this twenty-second day of July, A. D. one thousand nine hundred and nine.

CHARLES A. BLAIR. [L. S.]

Witnesses:
CHESTER BRADFORD,
THOMAS W. MCMEANS.

---

Copies of this patent may be obtained for five cents each, by addressing the "Commissioner of Patents, Washington, D. C."